United States Patent [19]

Clearwater

[11] Patent Number: 5,394,324
[45] Date of Patent: Feb. 28, 1995

[54] AUCTION-BASED CONTROL SYSTEM FOR ENERGY RESOURCE MANAGEMENT IN A BUILDING

[75] Inventor: Scott H. Clearwater, Woodside, Calif.

[73] Assignee: Xerox Corporation, Stamford, Conn.

[21] Appl. No.: 163,061

[22] Filed: Dec. 8, 1993

[51] Int. Cl.⁶ ............................................. G06F 15/20
[52] U.S. Cl. ................................. 364/402; 364/464.01; 364/140; 364/141; 364/408
[58] Field of Search ................... 364/402, 464.01, 140, 364/141, 505, 550, 408; 236/1 B; 165/2, 13, 14, 58, 59

[56] References Cited

U.S. PATENT DOCUMENTS

| | | | |
|---|---|---|---|
| 4,217,646 | 8/1980 | Caltagirone et al. | 165/22 |
| 4,500,034 | 2/1985 | Reese et al. | 236/49 |
| 4,661,914 | 4/1987 | Mulokey et al. | 364/505 |
| 4,918,615 | 4/1990 | Suzuki et al. | 364/140 |

OTHER PUBLICATIONS

Kenneth Steiglitz and Michael L. Honig, "Chaotic Behavior in an Auction-Based Micro-Economic Model," pp. 1–19.
IEEE Transactions on Software Engineering, Feb. 1992, vol. 18, No. 2.
Ross A. Gagliano et al., "Simulation of a Market Model for Distributed Control," Record of Proceedings, pp. 171–187, The 21st Annual Symposium Mar. 16–18 1988, Tampa, Fla.
Martin D. Fraser et al., "The Simulation of a Distributed Control Model for Resource Allocation and the Implied Pricing," Record of Proceedings, pp. 81–92, The 22nd Annual Symposium Mar. 28–31 1989, Tampa, Fla.
Martin D. Fraser et al., "Modeling the Cost of Resource Allocation in Distributed Control," Record of Proceedings, pp. 151–164, The 23rd Annual Symposium, Apr. 23–27 1990, Nashville, Tenn.
James F. Kurose et al., "A Microeconomic Approach to Optimal Resource Allocation in Distributed Computer Systems," IEEE Transactions on Computers, vol. 38, No. 5, May 1989.
James F. Kurose et al., "A Microeconomic Approach to Decentralized Optimization of Channel Access Policies in Multiaccess Networks," IEEE Publication, pp. 70–77, 1985.

*Primary Examiner*—Gail O. Hayes
*Assistant Examiner*—Frantzy Poinvil
*Attorney, Agent, or Firm*—Oliff & Berridge

[57] ABSTRACT

An auction-based apparatus and method for supplying temperature conditioned air. Each room in an office building makes a bid based on a difference between an actual temperature of the room and a desired temperature of the room. Each room submits the respective bid to a centralized computer that consummates sales based on an auction price. The centralized computer controls the amount of temperature conditioned air supplied to each of the respective rooms based on the consummated sales.

24 Claims, 4 Drawing Sheets

AUCTION-BASED CONTROL SYSTEM FOR ENERGY RESOURCE MANAGEMENT IN A BUILDING

BACKGROUND OF THE INVENTION

1. Field of the Invention

This invention relates generally to distribution of thermal resources in a building. More particularly, this invention relates to a method and apparatus for efficiently distributing a resource based on a computerized auction.

2. Description of Related Art

In spite of the revolutionary advances in digital technology and operations research that have taken place in the last decades, the state of the art in building environmental management does not often reflect those improvements. For instance, many modern buildings are still thermally controlled via pneumatic systems, while lighting in the offices is under manual (and inefficient) control. Further, many control algorithms using PID (proportional integral derivative) controls require a substantial investment in time to operate optimally.

In traditional building resource management, the temperature climate of each room of an office building is individually controlled. Accordingly, when an occupant desires to cool the room, he adjusts a thermostat to set a desired temperature. However, in such a system, if the occupants of several rooms each desire to cool their respective room, then it is necessary to produce more conditioned air for the entire office building. Therefore, the total amount of supplied conditioned air varies daily (and even hourly) based on the collective individual desires of the occupants of the office building.

At a more sophisticated level, efforts at efficiently controlling a building environment while taking into account individual preferences have mostly consisted of occupancy sensors, digital thermostats and light level controls. In some applications, work stations are also used to control the energy consumption settings, as well as monitor unusual changes in the operation of the building.

While in principle a controller with access to all the environmental and thermal parameters of the building (i.e., a perfect model) could optimally control the building, in practice, such knowledge is seldom in the system. Instead, personal information about local changes in the variables (such as instantaneous office occupancy, external temperature, and computer use) is the only reliable source that can be used in controlling the building environment. This leads to a distributed control system where most of the decisions are made at the local (i.e., office) level.

There are a number of constraints that come into play that limit the effectiveness of any building control system. For example, each office has a "time constant" which is a measure of the time it takes for the temperature in the office to respond to resource changes. The "time constant" is a function of the thermal properties (heat capacity) of the materials in the office, furniture, papers, etc. as well as of the walls and windows. There are other architectural limits that constrain the effectiveness of a control system to distribute resources. For instance, if the duct work has been poorly designed or maintained then it will be difficult for any control strategy to efficiently deliver proper resources. All control systems are also subject to the limitations of the sensors that provide them with information, their resolution, as well as the precision with which the dictates of the controllers are carried out by the actuators.

SUMMARY OF THE INVENTION

This invention solves the above and other problems of the prior art. In a first preferred embodiment, a heating, ventilating and air conditioning (HVAC) apparatus is provided for supplying a current amount of temperature conditioned air. The temperature conditioned air is distributed among a plurality of zones. Each zone receives a fraction of the temperature conditioned air. The HVAC apparatus comprises a duct network located throughout the plurality of the zones for distributing the temperature conditioned air. The apparatus also comprises a plurality of dampers, with each damper controlling the fraction of temperature conditioned air supplied to a corresponding zone. A plurality of dampers are located within the duct network. The apparatus further comprises a plurality of thermostats. One thermostat is located in each corresponding zone. Each thermostat measures an actual temperature of the corresponding zone and indicates a desired temperature of the corresponding zone. The thermostat further transmits a first signal representative of a relationship between the measured temperature of the corresponding zone and the desired temperature of the corresponding zone. The first signal is transmitted to a centralized computer and indicates one of a buy bid and a sell bid. The apparatus still further comprises a centralized computer receiving the first signal from the thermostat of each of the respective zones. The computer consummates a sale by matching an auction price with one of a buy bid and a sell bid for each respective zone. The centralized computer generates second signals when the sale is consummated. The second signals indicate new fractions of the temperature conditioned air for each zone involved in a consummated sale.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
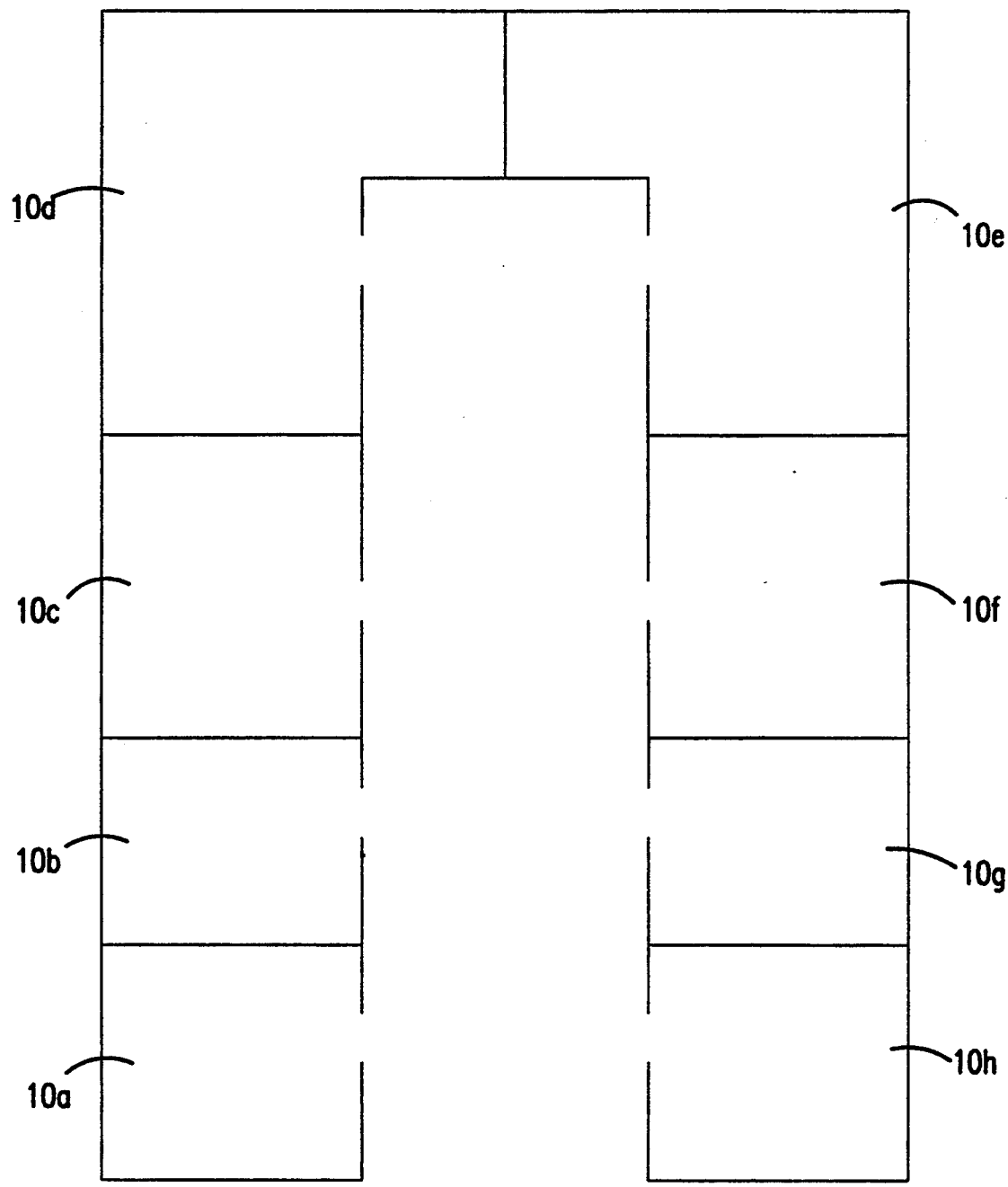
FIG. 1 is a illustration of a floor plan of an office building.

In a conventional office building, each floor includes a number of rooms (or zones). FIG. 1 shows a floor plan of one floor of an office building. The floor plan is divided into a number of rooms with each room labeled with a corresponding number $10a$, $10b$, $10c$ ... $10h$.

Each respective room is separately capable of maintaining the temperature climate of the room based on a combination of numerous factors such as personal preference, time of day and amount of sunlight. Accordingly, an occupant of a respective room (also called an agent) may wish to either cool the room, maintain the room temperature or heat the room. Although the preferred embodiment refers to the distribution of cold air in an air conditioning system, the preferred embodiment is easily adapted to distribute hot air or any other resource capable of exchanging heat with its surroundings.

Figure 2:
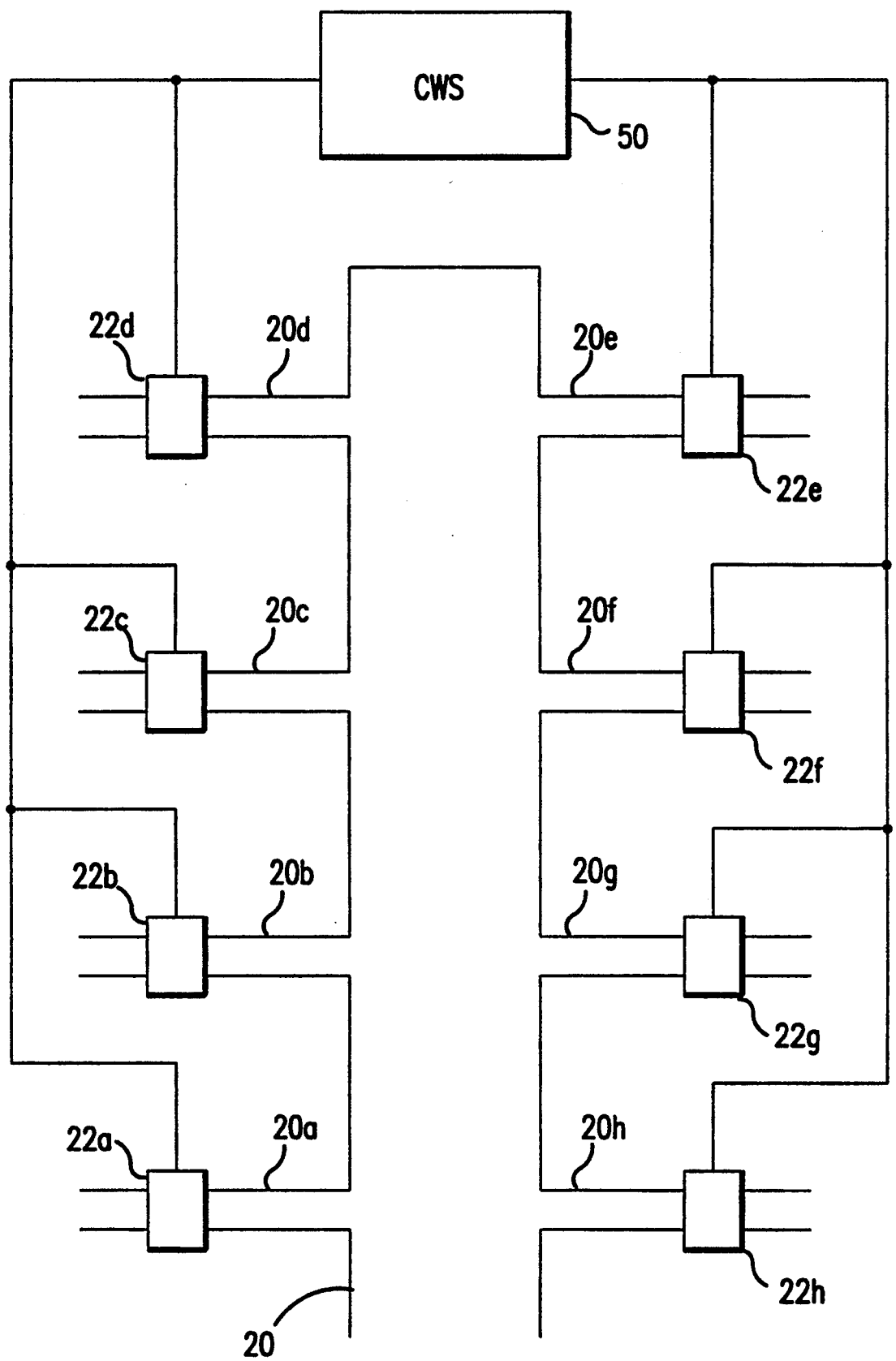
FIG. 2 is an illustration of a duct network located throughout an office building.

The temperature conditioned air (hereafter cold air) is generated in a conventional cooling plant (not shown) connected to the office building or a conventional HVAC system to supply the cold air throughout the office building. The cold air is distributed throughout the building in a duct network as is known in the art. FIG. 2 shows a main duct 20 through which the cold air (or hot air) is carried to each room through pipes in the walls and ceilings of the office building. The main duct 20 separates into a number of secondary ducts labeled 20a, 20b, 20c . . . 20h. Each of the secondary ducts directs cold air (or hot air) to one of the respective rooms 10a, 10b, 10c . . . 10h.

In the preferred embodiment, the amount of air distributed to each respective room through the duct network of FIG. 2 is controlled by a corresponding damper (or valve) 22a, 22b, 22c . . . 22h located along each secondary duct. Each damper 22a, 22b, 22c. . . 22h corresponds to a respective room 10a, 10b, 10c . . . 10h. Each damper operates to control the amount of air flowing through the respective secondary duct into each of the respective rooms as is known in the art. The control of each of the dampers will be described below with reference to the flow chart of FIG. 4.

Figure 3:
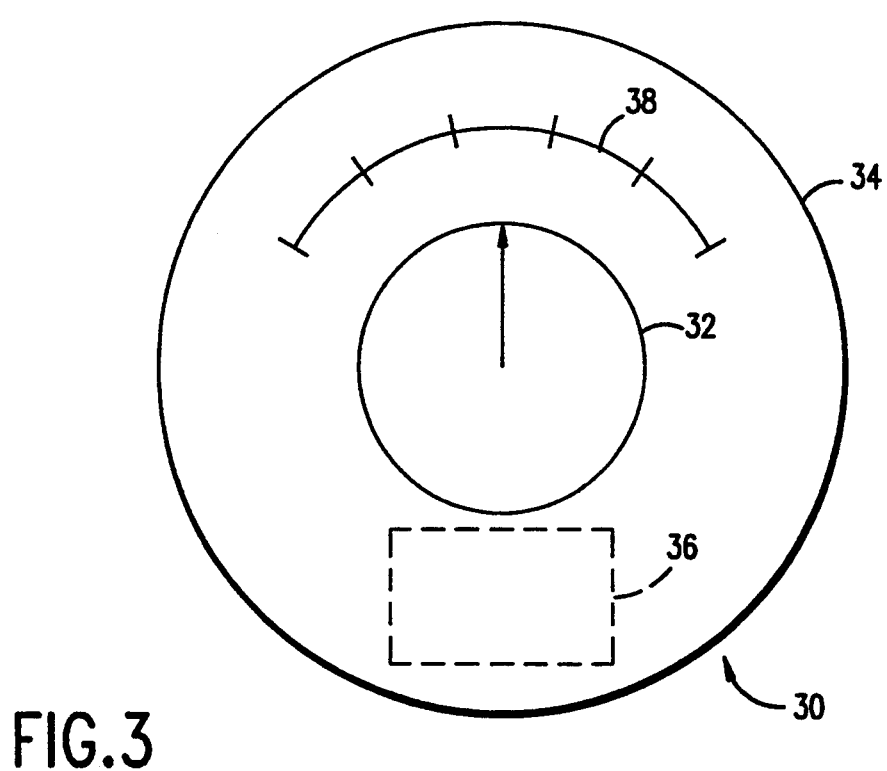
FIG. 3 is an illustration of a thermostat used in the first preferred embodiment.

In the preferred embodiment, each room is provided with a thermostat 30 such as that shown in FIG. 3. The thermostat 30 of FIG. 3 is shown merely for illustration purposes, as other embodiments are within the scope of this invention. In the preferred embodiment, the occupant of each room separately monitors and adjusts his/her own room temperature. In other embodiments, a group of several rooms may be commonly associated with one respective thermostat 30 to commonly monitor and control the group of rooms. In still yet another embodiment, each floor of the office building is provided with a separate thermostat 30 to separately control the temperature climate of that respective floor compared to the other respective floors of the office building. The preferred embodiment will be further discussed with each room having a separate thermostat 30 to control the temperature climate of the respective room.

Figure 4:
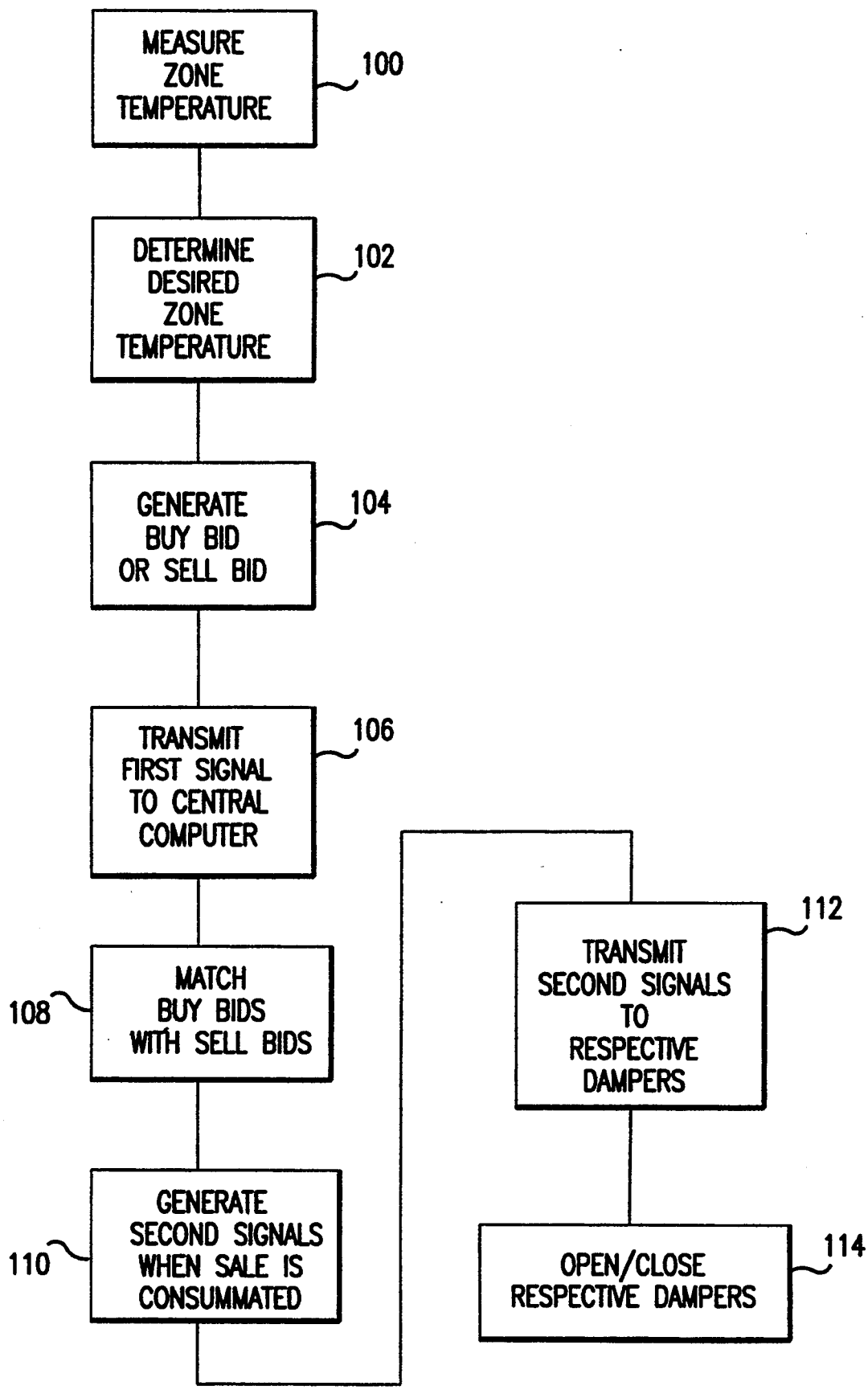
FIG. 4 is a flow chart of the method performed by the first preferred embodiment.

In step 100 of FIG. 4, the thermostat 30 measures the temperature of the respective room in a well-known manner. In step 102, the occupant (or agent) of the room rotates the inner knob 32 of the thermostat 30 to set the thermostat 30 to a desired temperature. Although step 102 is shown to follow step 100 in FIG. 4, the setting of the desired temperature can also occur prior to or virtually simultaneously with step 100. The inner knob 32 may be rotated to any position between a maximum and a minimum value. For illustration purposes, the occupant of the room can set the desired temperature between 50° F. and 80° F. To cool the room, the inner knob 32 is rotated counterclockwise so that the arrow or similar indicator on the inner knob 32 points to a desired temperature below the actual temperature on the temperature scale 38. When the occupant desires to heat the room, the inner knob 32 is similarly rotated in a clockwise manner to set the arrow or similar indicator to a desired temperature. A digital thermostat (not shown) may also be used as is known in the art.

In another embodiment, each room is separately supplied with a thermostat 30 capable of measuring the actual room temperature. However, in another embodiment, an office manager of the office building sets the desired temperature for each of the rooms by adjusting a master temperature control rather than each occupant separately adjusting the desired temperature of each respective room.

In the first preferred embodiment, a central workstation 50 sends an interrogation signal to each of the thermostats in each of the rooms. In step 104, a microprocessor 36 or similar device located on each thermostat 30 generates a signal in response to the interrogation signal based on a relationship between the actual temperature of the room and the desired temperature set by the rotating inner knob 32. The generated signal will be described below in more detail. The microprocessor 36 is shown for illustration purposes, although other signal generating apparatuses are capable of use in conjunction with thermostat 30. In the preferred embodiment, the central workstation 50 sends an interrogation signal every minute of the day between the hours of 8:00 a.m. and 6:00 p.m. The hours of operation of the preferred embodiment are set assuming that the occupants of the room will only be present during the hours indicated. Other time intervals are similarly within the scope of this invention.

The signal generated by each of the microprocessors 36 is classified as either a buy bid or a sell bid. The signal is classified as a buy bid when the desired temperature set by the inner knob 32 is less than the actual temperature of the room (i.e., the desired temperature is less than the actual temperature). A buy bid indicates that the occupant wishes to obtain more cold air than is currently being supplied to the room to cool the room. The signal is classified as a sell bid if the desired temperature set by the rotating inner knob 32 is greater than the actual temperature of the room (i.e., the desired temperature is greater than the actual temperature). A sell bid indicates that the occupant does not desire as much cold air as he is currently receiving. In another embodiment, which distributes hot air, the signal is classified as a buy bid when the desired temperature is greater than the actual temperature. Further, the signal is classified as a sell bid when the desired temperature is less than the actual temperature.

It is understood that each respectively generated signal is based on a relationship between the desired temperature of the room and the actual temperature. For example, the classification of the signal as either a buy bid or a sell bid for a cooling system may be determined from the following formula:

$$t_i = \frac{T_i^{setpt}}{T_i} \cdot \frac{<T>}{<T^{setpt}>} \quad (1)$$

where $t_i$ is the temperature of the ith office, $T_i^{setpt}$ is the temperature set point (i.e., desired temperature) of the ith office, $<T>$ is the average temperature of all the offices, and $<T^{setPt}>$ is the average temperature set point (i.e., average desired temperature) of all the offices. When $t_i$ is greater than 1, the operator is considered a seller and when $t_i$ is less than 1, the occupant is considered a buyer. Accordingly, a seller generates a sell bid while a buyer generates a buy bid. Other formulas of decision criteria are similarly within the scope of this invention. A heating auction uses a different formula to classify buy bids and sell bids. Generally the heating auction uses the inverse of Equation (1).

The signal generated by the microprocessor 36 is composed of two components: a price component and a volume component. The volume component indicates how much volume of cold air is desired for the respective room generating the signal. The volume is a function of the difference between the desired temperature and the actual temperature of the respective room among other things. The price component indicates a price that a buyer is willing to pay for the cold air. Naturally, buyers generally have a higher bid price for cold air since they have a greater desire for cold air than a seller. Likewise, sellers generally have a lower bid price than buyers because they have a lower desire for the cold air. Of course, the bid price will also depend on the difference between the desired and actual temperature.

In general, for each individual auction, the current amount of cold air is fixed, while the current amount of cold air for different auctions can change. For example, it is likely that the total demand for cold air will be low in the morning, rising to a maximum at around 3:00 p.m. and decreasing into the evening. Thus, since there is a net "surplus" of cold air relative to the current demand in the morning, the HVAC system can be programmed to decrease the total amount (or increase the temperature) of the temperature conditioned air in the morning. Then, the HVAC system can be programmed to gradually increase the total amount (or decrease the temperature) of the cold air until mid-afternoon, then gradually decrease the amount or increase the temperature of the cold air into the evening. Of course, this procedure would be generally reversed if the HVAC system was providing hot air rather than cold air.

Further, the HVAC system itself could have its own agent. This agent would act differently from the other agents, as it would not make bids prior to the auction, but would act as a market regulator. Thus, if there was a large net surplus of the temperature conditioned air, the HVAC agent would "buy" a percentage of the surplus. This would have the effect of taking the surplus bought by the HVAC agent out of the system, and would result in a reduction in the amount (or a change in the temperature) of the air. Likewise, if there was a large net demand, the HVAC agent would "sell" a percentage of the surplus. This would result in an increase in the amount (or a change in the temperature) of the air. In this way, the HVAC agent allows the HVAC system to dynamically react to the system's ability to meet the desired temperature. Thus, in the early morning, or on days where the ambient temperature greatly departs from the normal ambient temperature (for example a very cold summer day or a very warm winter day) the HVAC system can "buy" the surplus and reduce its energy consumption.

In step 106, the signal generated by each microprocessor 36 in each respective room 10a, 10b . . . 10h, is transmitted to a central workstation 50 or similar device (also hereinafter referred to as the auctioneer). The auctioneer receives and stores the buy bid signals and the sell bid signals generated from each microprocessor 36. As described below, in step 108, the auctioneer matches both buy bids and sell bids with an auction price to make a consummated sale.

The auctioneer distinguishes between the buy bid signals and the sell bid signals and stores each of the transmitted signals in a memory device such as RAM. The auctioneer then separately analyzes all of the buy bids and all of the sell bids.

Figure 5:
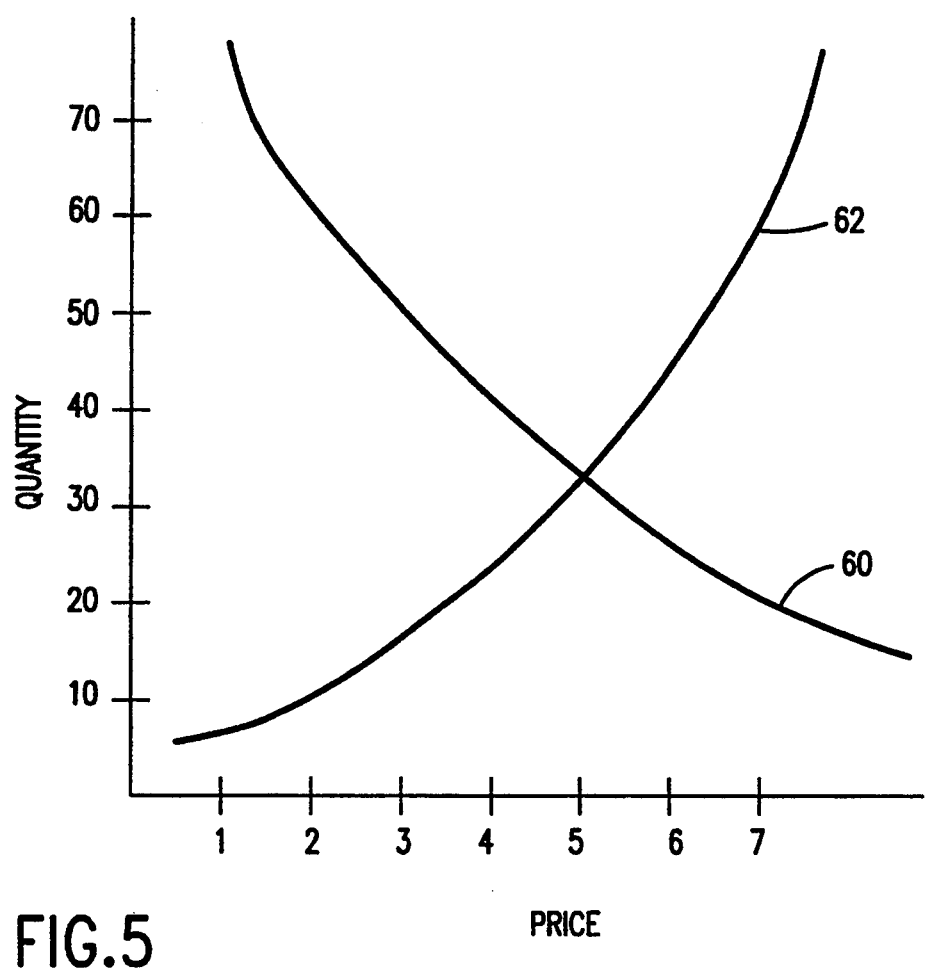
FIG. 5 is a supply-demand curve graph utilized by the first preferred embodiment.

The operation of the auctioneer will now be described. It is understood that the following method is implemented in the central workstation 50 as is well-known in the art. One skilled in the art would be capable of implementing the following method in the software of the central workstation 50. The respective buy bids and sell bids are plotted to form a demand curve 60 and a supply curve 62, respectively, such as shown in FIG. 5. The buy bids are plotted as a function of the volume and price to form a demand curve 60. The sell bids are similarly plotted as a function of the volume and price to yield a supply curve 62. The supply and demand curves determine the auction volume and auction price of cold air (or hot air) available for trade at a given price.

An auction price is set at a point where the supply curve 62 meets the demand curve 60. In FIG. 5, the auction price is set at 5. All agents whose sell bid is at or below the auction price and all agents whose buy bid is at or above the auction price will have their trades consummated and receive the thermal resource they requested (i.e., buyers will receive more cold air and sellers will receive less cold air). Accordingly, a buyer never pays more than his bid price. Similarly, a seller never receives less than his bid price. A trade based on a buy bid indicates that the respective room will be allocated more cold air. A trade based on a sell bid indicates that the respective room will receive a lesser amount of cold air.

The auctioneer computes the auction trade volume as a function of the price based on the price component and the volume component of each bid involved in a consummated sale. The total trade volume is computed as follows:

$$\text{trade volume} = V = \sum_{i=1}^{N} |1 - t_i|$$

where N is the number of rooms with consummated buys or sells and the actual amount of resource that each such room receives is based on the relative amount of resource that the operator requests. Other forms of volume criteria are similarly within the scope of this invention.

In step 110 of FIG. 4, the central workstation 50 (auctioneer) transmits a signal to each respective room taking place in a consummated sale. As previously discussed, a consummated sale indicates that either a buy bid is equal to or greater than the auction price or a sell bid is equal to or less than the auction price. Each of the signals generated by the computer are sent, in step 112, to the respective damper 22 corresponding to each respective room making either the buy bid or the sell bid in the consummated sale. The transmitted signals are indicative of the amount of cold air that should be supplied to each respective room. Specifically, the central workstation 50 transmits a signal to the damper corresponding to the room making the respective buy bid in the consummated sale that the respective damper should be opened more. In the preferred embodiment, the transmitted signal is indicative of the degree that the respective damper should be opened or closed from the present setting (i.e., close the damper by 10%). In other embodiments, the signal sent by the auctioneer indicates the percentage that the damper should be opened relative to a totally-opened position (i.e., 50%, 75%). Similarly, the workstation 50 transmits a signal to the damper of the corresponding room making the sell bid to indicate that the respective damper should be closed more.

In step 114, each respective damper 22 receiving a signal from the central workstation 50 (auctioneer) opens or closes in response to the transmitted signal. This thereby varies the amount of cool air that enters each of the respective rooms. Ideally, after the computer transmits the signal to each of the respective rooms to thereby open or close the respective damper 22, the temperature in each room will accordingly adjust to be closer to the desired temperature. However, because only a fixed amount of the cold air is available at any given moment, not every room will be cooled to the exact desired temperature. The actual temperature for each room will, however, be very close to that set by the occupant of the room and the thermal resource will be distributed in a more balanced way.

As the preferred embodiment repeats steps 100–114 of FIG. 4 every minute, each room will continually be monitored to closely match the actual temperature of the room to the desired temperature of the room. In the first embodiment, each auction is separately "budgeted," and the agent for each room or zone determines the buy or sell price based on the amount budgeted for the current auction. However, the "money" the agent uses isn't "real" in any sense.

In a second preferred embodiment, each room (or group of rooms or floor) is given a resource budget. The budget provides a maximum amount of money to be spent on resources such as electricity, heating and cooling for a given period of time (i.e, yearly, quarterly, monthly, etc.). The second embodiment operates similar to the first embodiment. However, the second embodiment operates using "real" money. For example, each time a seller makes a consummated sale, the seller receives an amount of money equal to the auction price times the amount of resources sold by the seller. Likewise, the buyer pays an amount of money equal to the auction price times the amount of resource bought by the seller. Although actual money need not necessarily exchange hands between the buyer and the seller, an appropriate credit amount or debit amount is made to the resource accounts of both the buyer and the seller. Therefore, each of the participants of the auction are able to either increase or decrease their resource budget by engaging in sales. This encourages the occupant (agent) to conserve resources when they are not desired by providing an incentive to sell unused resources.

Thus, should there be a net selling or buying of a resource, such as cold air, the total amount of temperature supplied by the HVAC plant (or other resource supplier) can be adjusted. In the case of the HVAC plant providing cold air, the total amount of cold air supplied by the plant is reduced or the temperature is increased, thus reducing the energy consumed by the HVAC plant in generating the supply of cold air. In another embodiment, electric energy is budgeted and traded in the same way. Again, if the system has no sellers, the price goes up, and the total amount of electricity consumed is reduced as the agents attempt to minimize their costs. On the other hand, the price goes up and the agents on the system have an increased incentive to become sellers. Thus, in these embodiments, at the end of the given time period, each participant who has not exceeded his/her resource budget for that time period may be given a monetary or other reward to compensate for his/her thrifty resource management.

In another embodiment, cold water passes through a number of radiators located in the building. Air is blown by a fan over a radiator to provide the cold air for each room. In such a system, the amount of cold water flowing through the radiator is indicative of the temperature of the cold air flowing in the duct network. Accordingly, the above-described market-based method may be applied to valves regulating the flow of cold water in the radiators. Then, the temperature of the cold air in the duct network would accordingly adjust.

In still yet another embodiment, similar to that described above, a two commodity auction-based system is provided to control either the amount of cold air provided by the HVAC plant (or other resource supplies) or the amount of hot air. Air is blown by a fan over a radiator to provide hot air. Both the amount of air blown by the fan and the amount of hot water flowing through the radiator may be regulated. The system is adapted to determine whether it is more efficient to decrease the amount of hot water or to decrease the amount of air flowing over the radiator when it is desired to cool the room. When it is desired to heat the room, the system either increases the amount of hot water flowing in the radiator or increases the amount of air flowing over the radiator. The decision whether to increase/decrease either the water or air is decided on a cost-benefit analysis so that a more efficient decision is made.

As contemplated, the entire auction-base control is a single computer program. The computational agents are procedures within that program and preferably do not physically reside in the room for which they are bidding. It is also within the scope of this invention to have computational agents residing in each room.

Unlike human auctions where one gets what one pays for, thermal markets are not as efficient. This is due to the unavoidable inefficiencies in the air distribution system. The air flowing through the duct work is a fluid flowing through pipes or analogous to an electrical current flowing through a resistor network. The duct work has a "resistance" that is a function of its shape that prevents proper distribution of air to the respective rooms. A very poorly designed duct system could ruin the performance of the auction. However, this could be overcome by having the respective agents adapt over time so that they effectively learn correlations between all the offices. The overall effect would shorten the time of thermal equilibrium among the offices.

The above-described auction method differs from a real auction in that the resources are not transferred from one operator to another, rather the resource that would have gone to one room is sent to another room by appropriately adjusting the dampers 22. The main duct 20 still carries the same amount of cold air throughout the office building. Accordingly, the average temperature of all of the office rooms remains the same. However, the standard deviation from the average temperature for all of the offices is significantly less than that using prior art methods. This is accomplished by varying the amount of cold air passing through each secondary duct $20a$, $20b$ . . . $20h$ by opening or closing the respective damper 22. It is an unusual case when all the rooms have their actual temperature equal to their desired setpoints and there is no trading. Of course, all of the rooms being at their set points is usually only a transient situation and once one of the temperatures drifts for whatever reason, there will be some trading. Finally, because the standard deviation of the average temperature has been decreased, it may be possible to raise (when supplying cold air) or lower (when supplying hot air) the average temperature supplied by the HVAC system while meeting all of the desired temperatures, thus realizing a net energy and cost savings.

While this invention has been described in conjunction with a specific apparatus, it is evident that many alternatives, modifications and variations will be apparent to those skilled in the art. Additionally, while various preferred embodiments of this invention are described, it is understood that this invention is not limited to the preferred embodiments. Rather, this invention is intended to cover all alternatives, modifications and equivalents within the spirit and scope of the present invention as defined by the appended claims.

What is claimed is:

1. An apparatus for efficiently distributing a resource among a plurality of sectors, each sector receiving a fraction of a total supplied amount of the resource, the apparatus comprising:
   resource distribution means for distributing the resource among the plurality of sectors based on the fraction calculated for each respective sector;
   consumer demand means for measuring a first value representative of an actual amount of the resource supplied to each respective sector and for determining a second value representative of a desired amount of the resource desired by each respective sector;
   difference means for computing a third value representative of a relationship between the first value of each sector and the second value of each sector;
   transmitting means for transmitting a first signal representative of the third value to an auctioning means, the first signal indicating one of a buy bid and a sell bid for each respective sector; and
   auctioning means for receiving the first signal from each of the plurality of sectors, for consummating a sale by comparing an auction price with at least one of the buy bid and the sell bid for each of the sectors, and for generating second signals when the sale is consummated, the second signals indicating new fractions of the total amount of the resource for the respective sectors making the buy bids and the sell bids in the consummated sale, the second signals transmitted to the resource distribution means, wherein the resource distribution means distributes the resource among the plurality of sectors based on the second signals transmitted to the resource distribution means.

2. The apparatus of claim 1, wherein the resource is one of hot air, cold air, hot water and cold water.

3. The apparatus of claim 1, wherein each one of the plurality of sectors corresponds to one of a floor of a building, a group of rooms in a building, and a room in a building.

4. The apparatus of claim 3, wherein the first value is representative of an actual temperature of the respective room.

5. The apparatus of claim 4, wherein the second value is representative of a desired temperature of the respective room.

6. The apparatus of claim 1, wherein the consumer demand means includes a thermostat.

7. The apparatus of claim 1, wherein the auctioning means includes a centralized computer.

8. The apparatus of claim 5, wherein when the resource is cold air, the first signal indicates a buy bid if the second value is less than the first value, and the first signal indicates a sell bid if the second value is greater than the first value.

9. The apparatus of claim 5, wherein when the resource is hot air, the first signal indicates a buy bid if the second value is greater than the first value, and the first signal indicates a sell bid if the second value is less than the first value.

10. The apparatus of claim 1, wherein the auctioning means further determines the auction price, the auction means consummating the sale with the buy bid when the value of the buy bid is at least a value of the auction price and the auctioning means consummating the sale with the sell bid when the value of the sell bid is at most the value of the auction price.

11. The apparatus of claim 1, wherein the difference means includes a microprocessor.

12. The apparatus of claim 1, wherein the resource comprises two commodities, and an efficiency computing device controls a relative supplied portion of each one of the two commodities based on a cost/benefit analysis.

13. The apparatus of claim 12, wherein the two commodities comprise hot air and cold air.

14. The apparatus of claim 12, wherein the two commodities comprise hot water and cold air.

15. The apparatus of claim 12, wherein the two commodities comprise cold water and hot air.

16. The apparatus of claim 12, wherein the two commodities comprise hot water and cold water.

17. The apparatus of claim 1, wherein the resource distribution means includes at least one radiator including a valve.

18. A heating, ventilating and air conditioning apparatus for supplying temperature conditioned air among a plurality of zones, each zone receiving a fraction of a total amount of temperature conditioned air, the apparatus comprising:
   a duct network located throughout the plurality of zones for distributing the temperature conditioned air, the temperature conditioned air passing through the duct network;
   a plurality of dampers, each damper controlling the fraction of temperature conditioned air for a corresponding zone, the plurality of dampers located throughout the duct network;
   a plurality of thermostats, one thermostat located in each corresponding zone, each thermostat measuring an actual temperature of the corresponding zone and indicating a desired temperature of the corresponding zone, wherein each thermostat transmits a first signal representative of a relationship between the measured temperature of the corresponding zone and the desired temperature of the corresponding zone, the first signal being transmitted to a centralized computer and indicating one of a buy bid and a sell bid; and
   the centralized computer comprising means for receiving the first signal from the thermostat of each of the zones and for consummating a sale by comparing an auction price with at least one of the buy bid and the sell bid for each zone, the centralized computer generating second signals when the sale is consummated, the second signals indicating new fractions of the total amount of the temperature conditioned air for the respective zones making the buy bids and the sell bids in the consummated sale, wherein the dampers of the respective zones control the new fractions of temperature conditioned air based on the second signals generated by the centralized computer.

19. The apparatus of claim 18, wherein each one of the plurality of zones corresponds to one of a floor of a building, a group of rooms in a building, and a room in a building.

20. The apparatus of claim 18, wherein when the temperature conditioned air is cold air, the first signal indicates a buy bid if the second value is less than the first value, and the first signal indicates a sell bid if the second value is greater than the first value.

21. The apparatus of claim 18, wherein when the temperature conditioned air is hot air, the first signal indicates a buy bid if the second value is greater than the first value, and the first signal indicates a sell bid if the second value is less than the first value.

22. The apparatus of claim 18, wherein the centralized computer further comprises means for determining the auction price, the centralized computer consummating the sale with the buy bid when the value of the buy bid is at least a value of the auction price and the centralized computer consummating the sale with the sell bid when the value of the sell bid is at most the value of the auction price.

23. The apparatus of claim 18, wherein when the temperature conditioned air comprises a first amount of cold air and a second amount of hot air, the first signal indicates a buy bid for cold air and a sell bid for hot air when the second value is less than the first value and the first signal indicates a buy bid for hot air and a sell bid for cold air when the second value is greater than the first value.

24. A market-based method for supplying temperature conditioned air, the temperature conditioned air distributed among a plurality of zones, the method comprising:
measuring an actual temperature of each corresponding zone;
determining a desired temperature for each corresponding zone;
generating a first signal for each zone based on a relationship between the measured temperature of the corresponding zone and the desired temperature of the corresponding zone, the first signal indicating one of a buy bid and a sell bid;
consummating with a computing apparatus, a sale between an auction price and at least one of the buy bid and the sell bid for each zone;
generating second signals corresponding to each zone when the sale is consummated, the second signals indicating new fractions of the temperature conditioned air for the respective zones making the buy bids and the sell bids in the consummated sale; and
supplying the new fraction of the total amount of temperature conditioned air to the respective zones making the one of the buy bid and the sell bid in the consummated sale.

* * * * *